United States Patent [19]

Shirasaka

[11] Patent Number: 4,815,043
[45] Date of Patent: Mar. 21, 1989

[54] ULTRASONIC IMAGING APPARATUS

[75] Inventor: Toshio Shirasaka, Tochigi, Japan

[73] Assignee: Kabushiki Kaisha Toshiba, Kawasaki, Japan

[21] Appl. No.: 116,952

[22] Filed: Nov. 5, 1987

[30] Foreign Application Priority Data

Nov. 13, 1986 [JP] Japan .................................. 61-271258

[51] Int. Cl.$^4$ ............................................. G03B 42/06
[52] U.S. Cl. ........................................ 367/7; 367/103; 367/11; 73/625
[58] Field of Search ..................... 367/103, 105, 7, 11; 73/620, 625, 627

[56] References Cited

U.S. PATENT DOCUMENTS

| | | | |
|---|---|---|---|
| 4,159,462 | 6/1979 | Rocha et al. | 73/626 |
| 4,215,584 | 8/1980 | Kuroda et al. | 367/105 |
| 4,543,826 | 10/1985 | Ferrari | 128/660 |
| 4,691,707 | 9/1987 | Sankar | 128/660 |

OTHER PUBLICATIONS

Japanese Patent Publication (Kokoku) No. 56-20017; M. Kuroda et al., May 11, 1981, (No Translation).

Primary Examiner—Thomas H. Tarcza
Assistant Examiner—Daniel T. Pihulic
Attorney, Agent, or Firm—Finnegan, Henderson, Farabow, Garrett, & Dunner

[57] ABSTRACT

An ultrasonic imaging apparatus comprises an ultrasonic transducer comprised of a plurality of ultrasonic transducer elements arranged in one direction, a transmission section for driving the ultrasonic transducer to radiate first and second ultrasonic beams from the ultrasonic transducer at a time in their different directions, and a receiver section for processing echo signals which are obtained from the ultrasonic transducer means and for outputting first and second television signals. Television signals are displayed as two lines of raster on a monitor.

11 Claims, 5 Drawing Sheets

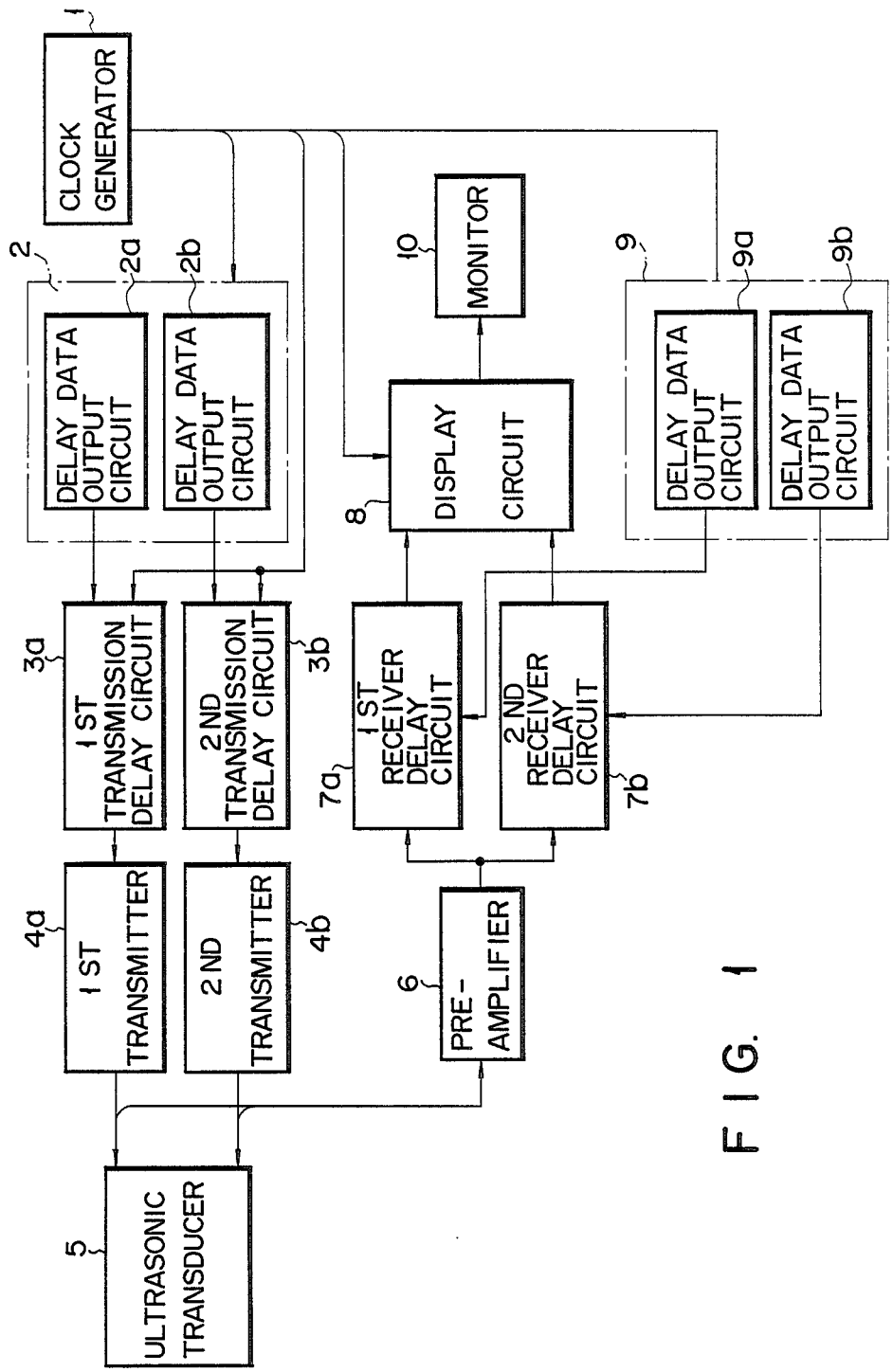
F I G. 1

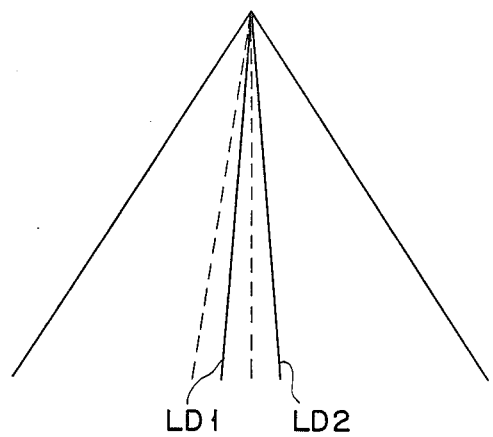
F I G. 2
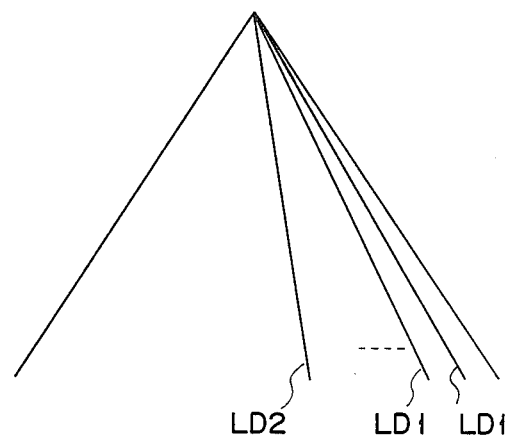
F I G. 5

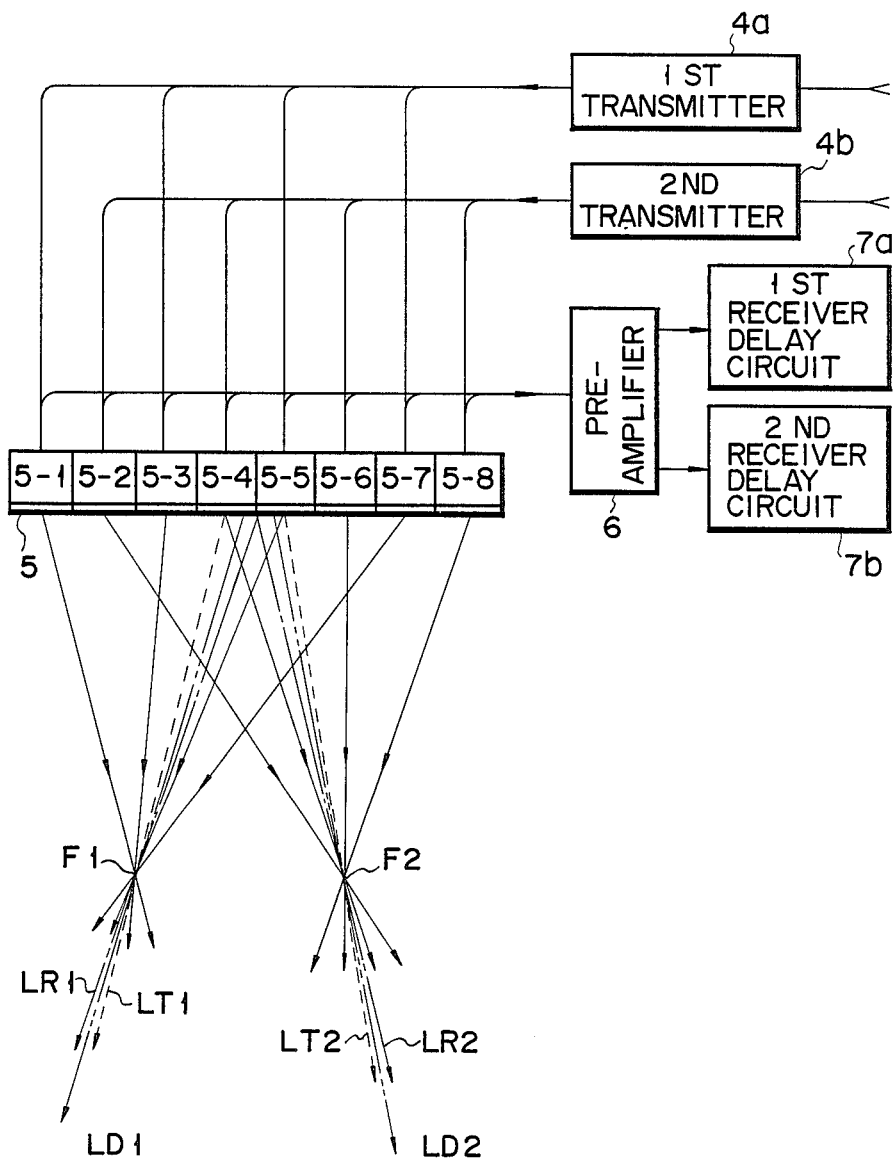
F I G. 3

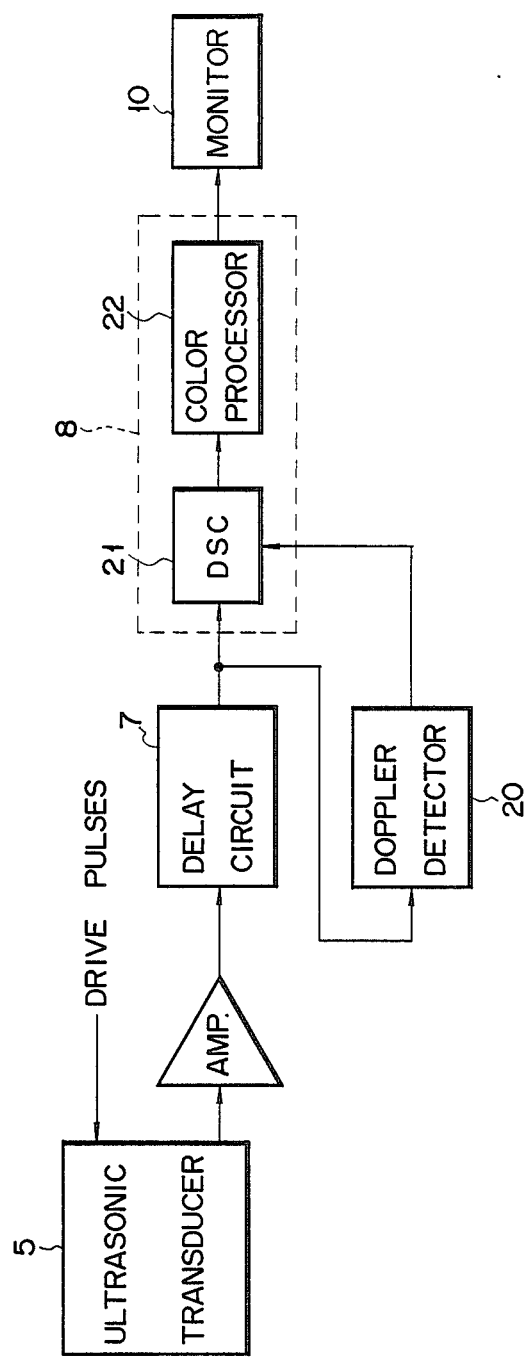
F I G. 6

ULTRASONIC IMAGING APPARATUS

BACKGROUND OF THE INVENTION

This invention relates to an ultrasonic imaging apparatus and, in particular, to an ultrasonic imaging apparatus for use in medical diagnosis.

An ultrasonic imaging apparatus is known which is adapted to scan a human subject with an ultrasonic beam emitted from an ultrasonic transducer, comprised of an array of ultrasonic transducer elements, to process the echo signals obtained and to display them, as a tomographic image, on the screen of a monitor. This type of ultrasonic imaging apparatus is utilized as an ultrasonic diagnosis apparatus in the practice of medicine.

In the aforementioned ultrasonic imaging apparatus, since the time taken from the transmission of the ultrasonic wave to the reception of echo signals is necessarily above a given value due to the speed of sound travelling through the living body, a requisite time of one cycle including a dwell time from one transmission/reception cycle to the next transmission becomes considerably longer, placing an inherent limitation on the obtainment of a tomographic image in real time. In order to effectively utilize the requisite time of one cycle, two reception circuits are provided in a parallel fashion so that two kinds of reception signals are obtained from a single ultrasonic transmission so as to substantially form a double scanning line. This type of apparatus is disclosed, for example, in Japanese Patent Publication (KOKOKU) No. 56-20017.

With this method, two sound waves, each corresponding to a composition of one-direction transmission sound field and each of two reception sound fields, are detected as two echo waves. As the distance of the two reception beams becomes greater, both sound fields are displaced in a different direction, thus leading to a lowering in their reception sensitivity and a variation in their beam widths.

SUMMARY OF THE INVENTION

It is accordingly the object of this invention to provide an ultrasonic imaging apparatus which can increase the number of raster lines or frames without producing a lowering of reception sensitivity and variation of the beam width.

According to this invention, an ultrasonic imaging apparatus is provided which can radiate at least two ultrasonic beams at a time in different directions and can obtain two corresponding echo signals in the same direction.

Furthermore, according to this invention, a group of odd-numbered ultrasonic elements and group of even-numbered ultrasonic elements are so driven as to radiate ultrasonic beams in different directions, and echo waves obtained in the same directions are converted to echo signals. These echo signals are subjected to signal processing and the resultant signals are displayed, as two raster lines, on a monitor.

BRIEF DESCRIPTION OF THE DRAWINGS

FIG. 1 is a block circuit diagram showing an ultrasonic imaging apparatus according to one embodiment of this invention;

FIG. 2 shows two ultrasonic beams in a sector scan mode which are obtained from the apparatus of FIG. 1;

FIG. 3 is a block circuit diagram showing a major section for explaining the operation of the ultrasonic imaging apparatus of FIG. 1;

FIG. 5 shows a sector scan mode when Doppler components are obtained; and

FIG. 6 is a block circuit of the ultrasonic imaging apparatus including a Doppler detector.

DETAILED DESCRIPTION OF THE PREFERRED EMBODIMENTS

Figure 4:
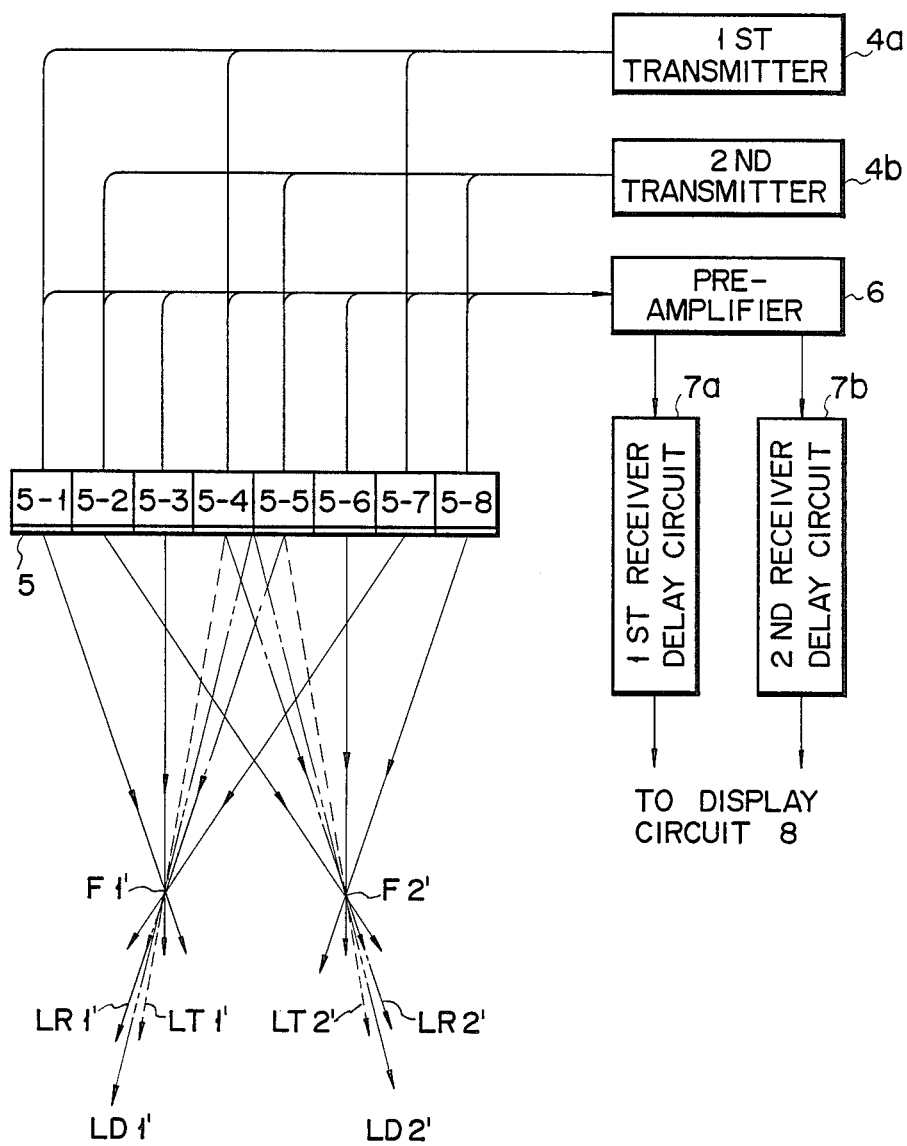
FIG. 4 is a view showing the direction in which an ultrasonic beam is radiated from another modification of the aforementioned ultrasonic imaging apparatus.

In FIG. 1, ultrasonic transducer 5 is comprised of a plurality of ultrasonic transducer elements arranged in one direction, for example, an array of ultrasonic transducer elements 5-1 to 5-8. Odd numbered ultrasonic transducer elements 5-1, 5-3, 5-5 and 5-7 are connected to the output terminals of first transmitter 4a and even numbered ultrasonic transducer elements 5-2, 5-4, 5-6 and 5-8 are connected to the output terminals of second transmitter 4b.

In a transmitting system, ultrasonic transducer elements 5-1 to 5-8 are connected to the output terminals of first and second transmitters 4a and 4b. First and second transmitters 4a and 4b have drive pulse generators which output drive pulses for driving the corresponding ultrasonic transducer elements.

The input terminals of first and second transmitters 4a and 4b are connected to the output terminals of first and second transmission delay circuits 3a and 3b, respectively, and delay circuits 3a and 3b provide delay times corresponding to the radiation directions of ultrasonic beams to first and second transmitters 4a and 4b, respectively.

The output terminals of first and second delay data output circuits 2a and 2b in transmission delay data generator 2 are connected to the input terminals of first and second transmission delay circuits 3a and 3b, respectively, and the output terminal of reference clock generator 1 is connected to the input terminals of first and second transmission delay circuits 3a and 3b. First and second delay data output circuits 2a and 2b in transmission delay data generator 2 send delay data to first and second transmission delay circuits 3a and 3b, respectively, in synchronization with the clock pulses.

In a reception system, the output terminals of ultrasonic transducer 5 are connected to the input terminals of preamplifier section 6 including preamplifiers for amplifying the output signals of ultrasonic transducer elements 5-1 to 5-8.

The output terminals of preamplifier section 6 are connected to first and second receiver delay circuits 7a and 7b. First and second receiver delay circuits 7a and 7b include delay elements for delaying echo signals in accordance with transmission delay times. Receiver delay circuits 7a and 7b have their delay times set by the delay data of delay data output circuits 9a and 9b in receiver delay data generator 9.

The output terminals of first and second receiver delay circuits 7a and 7b are connected to display monitor 10 through display circuit 8.

When a sector scanning operation is performed on the ultrasonic imaging apparatus of FIG. 1, two ultrasonic beams LT1 and LT2 are radiated at a time from ultrasonic transducer 5. In this case, as shown in FIG. 3, the odd numbered ultrasonic transducer elements 5-1, 5-3, 5-5 and 5-7 are so driven as to focus their ultrasonic beams at a point (focal point) F1 and the even numbered ultrasonic transducer elements 5-2, 5-4, 5-6 and 5-8 are so driven as to focus their ultrasonic beams at a point (focal point) F2. To this end, transmission delay data generator 2 outputs such delay data as to obtain the focal points F1 and F2. First and second delay circuits 3a and 3b, upon receipt of transmission delay data, deliver the corresponding data to first and second transmitters 4a and 4b.

First transmitter 4a drives the odd numbered ultrasonic transducer elements 5-1, 5-3, 5-5 and 5-7 in a time delay fashion to obtain the focal point F1 and second transmitter 4b drives the even numbered ultrasonic transducer elements 5-2, 5-4, 5-6 and 5-8 in a time delay fashion to obtain the focal point F2.

Ultrasonic transducer elements 5-1 to 5-8, upon receipt of echoes, convert them to echo signals. Preamplifier section 6, upon receipt of the echo signals, sends them to first and second receiver delay circuits 7a and 7b after they have been amplified. Delay circuits 7a and 7b subject the echo signals to a delay processing in accordance with the transmission delay times involved. In order to correct a positional discrepancy between the ultrasonic beam obtained by a group of odd-numbered ultrasonic transducer elements at the time of transmission and the ultrasonic beam obtained by the array of all ultrasonic transducer elements at the time of reception, the reception delay time is set so that the reception beam coincides with a raster line LR1 for the focal point F1. A transmission/reception beam LD1 is formed as a composite beam of raster lines LT1 and LR1.

Similarly, the reception delay time is set so that the reception beam coincides with a raster line LR2 for the focal point F2 and a transmission/reception beam LD2 is formed as a composite beam of the raster lines LT2 and LR2. It is to be noted that a discrepancy in position between the transmission and reception waves is ½ pitch for the ultrasonic elements.

The echo signals which are delay-processed by first and second receiver delay circuits 7a and 7b are supplied to display circuit 8 which includes, for example, a detector or a digital scan converter. Display circuit 8 converts the echo signals to television signals and sends them to display monitor 10. Monitor 10 displays two lines of beams at a time, as shown in FIG. 2.

In this way, scanning is performed, while two beams are being formed at a time, to allow a tomographic image to be displayed on monitor. That is, one frame is displayed with double the number of raster lines, thus improving the image resolution. In this case, two lines of rasters may be displayed during a sequential scan or displayed in a manner to put one line of raster between two lines of scans, as indicated by a broken line in FIG. 2. Furthermore, if the number of raster lines given for one frame is the same as that of a conventional device, it is possible to display two frames during one frame scanning period. That is, for the initial half scanning period, one frame is provided by two lines of scan and for the next half scanning period another frame is provided in a similar way. That is, if a display is made with the number of frames given for a predetermined time period, the number of raster lines is doubled and, on the other hand, with the number of raster lines given for an identical time period the number of frames is doubled.

In the aforementioned embodiment, the discrepancy in position between the transmission and reception signals is corrected through control of delay times. This control can be made by the following method.

As shown in FIG. 4, transmission beams involved at the odd-numbered transducer elements are set in the direction of LT1' which is the same as the direction LT1 of the transmission beam in the aforementioned embodiment. The echo beams are received only at transducer elements 5-3, 5-5 and 5-7, in which case the echo beams are set in the LR1' direction. In this case, a composition beam LD1' between the reception beam LT1' and the echo beam LR1' is set at a boundary of two middle transducer elements 5-4 and 5-5.

Similarly, the transmission beams involved at even-numbered transducer elements 5-2, 5-4, 5-6 and 5-8 are set in the LT2' direction which is the same as the LT2 direction of the transmission beams in the aforementioned embodiment. On the other hand, the echo beams are received only at transducer elements 5-4, 5-6 and 5-8, in which case the echo beams are set in the LR2' direction. Thus a composition beam LD2' of the reception beam LT2' and echo beam LR2' is set at a boundary of two middle transducer elements 5-4 and 5-5.

That is, a deflection support point for two composition beams LD1' and LD2' coincides with the boundary of two middle transducer elements in ultrasonic transducer 5 to provide a complete sector between two composition beams LD1' and LD2'.

Where transducer 5 is driven in an attempt to obtain a beam as shown in FIG. 4, first and second transmitters 4a and 4b drive ultrasonic transducer 5 at the transmission system as in the first-mentioned embodiment. In the reception system, first and second receiver delay circuits 7a and 7b subject transducer elements 5-3, 5-5 and 5-7 and 5-4, 5-6 and 5-8, to a delay processing as in the case of the first-mentioned embodiment.

The ultrasonic imaging apparatus of this invention can detect Doppler information and be applied to color Doppler display. In this case, of a pair of beams (LD1, LD2), one beam LD1 is used for sector scanning and the other beam LD2 scans the same spot a plurality of times in an attempt to obtain the Doppler shift. That is, as shown in FIG. 5, the beam LD1 sequentially scans the scan areas and the beam LD2 scans the same spot a plurality of times, for example, 8 times. The echo signals obtained by the beam LD2 are supplied to Doppler detector 20 through delay circuit 7 as shown in FIG. 6 and Doppler shift components are detected from the echo signals which have been obtained by eight scans. The Doppler shift components are supplied to digital scan converter 21 in display circuit 8, where they are converted to a color television signal. On the other hand, the echo signal for a tomograph, i.e., the output signal of delay circuit 7 is supplied to digital scan converter 21 to convert it into a television signal. Monitor 10, upon a receipt of the Doppler color signals, displays, in addition to a tomographic image, a Doppler color image.

This invention can effectively be applied to the case where an image signal is obtained through the scanning of the same spot a plurality of times as in the color display of the Doppler components.

Although, in the aforementioned embodiment, two ultrasonic beams have been explained as being transmitted at a time, three or more ultrasonic waves may be transmitted at a time, in which case ultrasonic transducer elements may be driven, for example, at two or three time intervals.

What is claimed is:

1. An ultrasonic imaging apparatus, comprising:
   ultrasonic transducer means having a plurality of ultrasonic transducer elements arranged in one direction and divided into at least first and second element groups, for generating ultrasonic waves and for converting echo waves to echo signals;
   transmission means for driving the ultrasonic transducer means so as to simultaneously radiate at least first and second ultrasonic beams from the first an second element groups of the ultrasonic transducer elements in different directions; and
   receiver means for processing the echo signals obtained from said ultrasonic transducer means and corresponding to said first and second ultrasonic beams, to produce first and second television signals.

2. An ultrasonic imaging apparatus according to claim 1, wherein said transmission means includes first driving means for driving said first element group including odd-numbered ones of said ultrasonic transducer elements to generate said first ultrasonic beams, and second driving means for driving said second element group including even-numbered ones of said ultrasonic transducer elements to generate said second ultrasonic beams.

3. An ultrasonic imaging apparatus according to claim 1, wherein said transmission means drives said ultrasonic transducer means to sector-scan with said first and second ultrasonic beams.

4. An ultrasonic imaging apparatus according to claim 3, wherein said transmission means comprises:
   delay data output means for outputting delay data corresponding to said first and second ultrasonic beams;
   delay circuit means for setting delay times according to the delay data of said delay data output means; and
   means for outputting drive pulses to said ultrasonic transducer elements in accordance with the delay times of said delay circuit means.

5. An ultrasonic imaging apparatus according to claim 1, wherein said receiver means comprises:
   receiver delay means for delaying the echo signals obtained from the transducer elements of said ultrasonic transducer means, to obtain delay-processed signals and for outputting the delay processed signals as first and second echo signals corresponding to said first and second ultrasonic beams; and
   means for converting the first and second echo signals obtained from said receiver delay means into said television signals.

6. An ultrasonic imaging apparatus according to claim 5, wherein said receiver delay means includes means for correcting a discrepancy between each of said first and second ultrasonic beams and said first and second echo signals, respectively.

7. An ultrasonic imaging apparatus according to claim 5, wherein said first and second echo signals include odd-numbered echo signals and even-numbered echo signals, and said receiver delay means includes:
   first delay means for subjecting the odd-numbered echo signals to a delay processing with the echo signal of one of the odd-numbered transducer elements eliminated, and
   second delay means for subjecting the even-numbered echo signals to a delay processing with one of the even-numbered echo signals eliminated.

8. An ultrasonic imaging apparatus according to claim 1, wherein said transmission means drives said ultrasonic transducer means to generate said first ultrasonic beam for scanning a subject to be examined in a sector mode, and said second ultrasonic beam for scanning a spot of said subject a plurality of times, said receiver means including means for extracting Doppler components from echo signals corresponding to said second ultrasonic beam and means for converting said doppler components to color signals.

9. An ultrasonic imaging apparatus according to claim 1, wherein said receiver means has monitor means for displaying said television signals as an image.

10. An ultrasonic imaging apparatus, comprising:
    ultrasonic transducer means, having a plurality of ultrasonic transducer elements arranged in a line and divided into a plurality of element groups, for generating ultrasonic beams and for converting echoes of the ultrasonic beams to echo signals;
    transmission means for driving the ultrasonic transducer means so as to simultaneously radiate a plurality of ultrasonic beams from the element groups of the ultrasonic transducer elements in different directions;
    receiver means for processing the echo signals obtained from said ultrasonic transducer means and corresponding to said ultrasonic beams, to produce a plurality of television signals; and
    display means for displaying the television signals as an image.

11. An ultrasonic imaging apparatus, comprising:
    ultrasonic transducer means, having a plurality of ultrasonic transducer elements arranged in a line and divided into at least first and second element groups, for generating ultrasonic beams and for converting echoes of the ultrasonic beams to echo signals;
    transmission means for driving the ultrasonic transducer means so that said first and second element groups of the ultrasonic transducer elements simultaneously radiate at least first and second ultrasonic beams in first and second directions;
    receiver means for processing the echo signals corresponding to the echoes of the first and second ultrasonic beams, and producing television signals in response to said echo signals; and
    display means for displaying the television signals as an image.

* * * * *